(12) United States Patent
Huang et al.

(10) Patent No.: US 7,648,799 B2
(45) Date of Patent: Jan. 19, 2010

(54) MULTI-LAYER POSITIVE ELECTRODE STRUCTURES HAVING A SILVER-CONTAINING LAYER FOR MINIATURE CELLS

(75) Inventors: Weiwei Huang, Westlake, OH (US);
Brandon A. Bartling, Avon Lake, OH (US)

(73) Assignee: Eveready Battery Co., Inc., St. Louis, MO (US)

( * ) Notice: Subject to any disclaimer, the term of this patent is extended or adjusted under 35 U.S.C. 154(b) by 525 days.

(21) Appl. No.: 11/731,361

(22) Filed: Mar. 30, 2007

(65) Prior Publication Data
US 2008/0241682 A1    Oct. 2, 2008

(51) Int. Cl.
*H01M 10/26*   (2006.01)
*H01M 4/34*   (2006.01)
*H01M 4/54*   (2006.01)
*H01M 10/32*   (2006.01)

(52) U.S. Cl. .................................. 429/206; 429/219
(58) Field of Classification Search .................. 429/206
See application file for complete search history.

(56) References Cited

U.S. PATENT DOCUMENTS

| | | | |
|---|---|---|---|
| 3,630,780 A | 12/1971 | Berndt et al. | |
| 3,920,478 A | 11/1975 | Kozawa | |
| 3,956,018 A | 5/1976 | Kozawa | |
| 3,994,746 A | 11/1976 | Sakai et al. | |
| 4,015,056 A | 3/1977 | Megahed et al. | |
| 4,038,467 A | 7/1977 | Lippold et al. | |
| 4,172,183 A | 10/1979 | Ruetschi | |
| 4,192,914 A | 3/1980 | Ruetschi | |
| 4,250,234 A | 2/1981 | Langan | |
| 4,370,395 A | 1/1983 | Nagaura et al. | |
| 4,405,698 A | 9/1983 | Nagaura | |
| 4,520,087 A | 5/1985 | Kamata et al. | |
| 6,001,508 A | 12/1999 | Passaniti et al. | |
| 6,080,283 A | 6/2000 | Ray | |
| 6,794,082 B2 | 9/2004 | Mori et al. | |
| 2002/0127469 A1 | 9/2002 | Mori et al. | |
| 2005/0058903 A1 | 3/2005 | Eylem et al. | |

(Continued)

FOREIGN PATENT DOCUMENTS

EP    1594180 A    11/2005

(Continued)

OTHER PUBLICATIONS

Patent Cooperation Treaty (PCT) International Search Report and Written Opinion for Application No. PCT/US2008/011956, filed Feb. 14, 2008, mailed Jun. 19, 2008, European Patent Office, Netherlands.

*Primary Examiner*—Patrick Ryan
*Assistant Examiner*—Ashley Kwon
(74) *Attorney, Agent, or Firm*—Russell H. Toye, Jr.

(57) ABSTRACT

A silver-containing alkaline electrochemical cell and methods for producing the cell, wherein the cell includes a negative electrode, a positive electrode, a separator disposed between the electrodes, and an alkaline electrolyte, wherein the positive electrode is formed as a multi-layer composite including a silver-containing oxide layer and a barrier layer, initially free of silver-containing material, disposed between the silver-containing oxide layer and the separator for substantially reducing migration of silver ions to the separator and negative electrode.

13 Claims, 1 Drawing Sheet

U.S. PATENT DOCUMENTS

| | | |
|---|---|---|
| 2006/0141360 A1 | 6/2006 | Tanoue |
| 2006/0166095 A1 | 7/2006 | Kato et al. |
| 2006/0222932 A1 | 10/2006 | Tanoue |

FOREIGN PATENT DOCUMENTS

| | | |
|---|---|---|
| GB | 1442937 | 7/1976 |
| JP | 55-032344 | 3/1980 |
| JP | 55-141067 | 11/1980 |
| JP | 56-006378 | 1/1981 |
| JP | 56-015555 | 2/1981 |
| JP | 56-015556 | 2/1981 |
| JP | 56-015560 | 2/1981 |
| JP | 56-015561 | 2/1981 |
| JP | 58-094757 | 6/1983 |
| JP | 58-163151 | 9/1983 |
| JP | 58-218756 | 12/1983 |
| JP | 58-218764 | 12/1983 |
| JP | 63-200465 | 8/1988 |
| JP | 2006-024447 | 1/2006 | ns
MULTI-LAYER POSITIVE ELECTRODE STRUCTURES HAVING A SILVER-CONTAINING LAYER FOR MINIATURE CELLS

FIELD OF THE INVENTION

The present invention relates to a silver-containing alkaline electrochemical cell and methods for producing the cell, wherein the cell includes a negative electrode, a positive electrode, a separator disposed between the electrodes, and an alkaline electrolyte, wherein the positive electrode is formed as a multi-layer composite including a silver-containing oxide layer and a barrier layer initially free of silver-containing material disposed between the silver-containing oxide layer and the separator for reducing migration of silver ions to the separator and negative electrode.

BACKGROUND OF THE INVENTION

Electrochemical cells, such as alkaline cells having a positive electrode including a metal oxide such as silver oxide, are commonly used as electrical energy sources. The battery is a primary power source for many portable electronic devices such as cameras, radios, toys, games, hearing aids, medical apparatus, such as insulin pumps, watches, printers, calculators, and the like.

Cells containing a metal oxide are usually noted for good voltage stability during discharge. It has been found, however, that during storage, especially at high temperatures, separator layers, such as cellulosic materials can be attacked and degraded or destroyed, for example, by the metal ions such as silver ions from the positive electrode that migrate to the separator as well as to the negative electrode where the silver ions can be reduced by the active materials and deposited on the surface thereof as metallic particles. The negative electrode can be oxidized and thereby undergo self-discharge which can reduce total capacity of the cell. To combat degradation of the separator, one construction that has been utilized was a multi-layer degradation resistant separator such as polyethylene and cellophane. However, such separators can be relatively expensive and further can have a volume which reduces the amount of active materials that can be contained in the cell.

Positive electrodes, including various layered or composite materials, have been disclosed in the art.

U.S. Pat. No. 3,630,780 relates to silver oxide electrodes for electric batteries, particularly primary batteries reportedly capable of delivering a high temporary current output, produced by compressing a mixture of 10 to 40 percent by weight of pulverulent silver oxide and 60 to 90 percent of pulverulent nickel, and hard-pressing the resulting compressed layer onto a carrier structure, preferably of copper or silver, at pressures of about 0.5 to about 1.4 t/cm.$^2$ in an oxidizing or inert atmosphere at a hot-pressing temperature below the dissociation temperature of the silver oxide, this temperature being generally between about 100° C. and about 300° C.

U.S. Pat. No. 4,038,467 relates to a galvanic cell with negative zinc electrode and positive electrode of AgO, the AgO is surface-reduced to $Ag_2O$, and insulated from the current takeoff, to which connection is made only by a porous silver layer.

U.S. Pat. No. 4,172,183 relates to an alkaline primary cell comprising a positive electrode having an upper layer, facing the negative electrode, of electrolytic γ-manganese dioxide to which 6-16% of graphite powder having a broad grain-size range has been added as a conducting additive. Disposed beneath this upper layer is at least one further layer containing γ-manganese dioxide, mercuric oxide, or monovalent silver oxide having a higher apparent specific gravity than the upper layer. A separator comprising at least one membrane layer is situated above the positive electrode.

U.S. Patent Application Publication No. 2005/0058903 relates to a battery that includes a cathode having an oxide containing one or more metals and pentavalent bismuth, an anode, a separator between the cathode and the anode, and an alkaline electrolyte. The metal(s) can be an alkali metal, an alkaline earth metal, a transition metal, and/or a main group metal. The separator reportedly can be ion-selective or capable of substantially preventing soluble bismuth ionic species from diffusing from the cathode to the anode.

Japanese Laid-Open Publication No. 56-06378 relates to reportedly improving the discharge rate and storability of a cell, by using a member comprising a porous nickel material of a three-dimensional network and porous material of silver or the like and having a specific structure, as a current collector between a positive electrode mainly composed of divalent silver oxide and a positive electrode case.

Japanese Laid-Open Publication No. 56-015561 relates to obtaining a battery reportedly with a long maintenance of high discharge-voltage and of a low cost by mixing graphite with nickel oxyhydroxide as a substitute for silver oxide.

Japanese Laid-Open Publication No. 58-163151 relates to reportedly improving the heavy load electric discharge characteristic by constituting the positive electrode black mix from an applied layer made of manganese dioxide on graphite which is formed on the surface of silver oxide in granular form.

SUMMARY OF THE INVENTION

It is, therefore, an object of the present invention to provide an electrochemical cell, including a silver-containing oxide, having good voltage stability and high operating voltage during discharge.

Still another object of the invention is to provide a cell including a silver-containing oxide such as silver oxide and silver nickel oxide that exhibits good storage life.

A further object of the invention is to provide a cell construction which inhibits silver ion migration to the separator and negative electrode.

Another object of the invention is to provide a cell with a positive electrode including a sliver-containing oxide and at least one other less expensive active material.

Another object of the invention is to provide a cell construction which allows a relatively inexpensive separator to be utilized.

Yet another object is to provide a cell that utilizes a relatively thin separator and thereby allows a greater amount of active materials to be contained within the cell.

Still another object is to provide a method for producing a positive electrode having multiple layers, such as an electrode pellet, wherein prior to insertion into the cell, the surfaces of the electrode are identifiable thereby aiding in the placement of the electrode within a cell casing.

In one aspect of the invention, a primary electrochemical cell is disclosed, comprising an aqueous alkaline electrolyte, a negative electrode in electrical contact with a negative casing, a positive electrode in electrical contact with a positive casing, an insulating gasket disposed between the negative casing and the positive casing, and a separator disposed between the negative electrode and the positive electrode. The positive electrode includes a first layer that is in electrical contact with the positive casing and comprises one or more silver-containing oxides; the positive electrode comprises one or more barrier layers disposed on the first layer between the first layer and the separator; at least one of the one or more barrier layers comprises one or more of nickel oxyhydroxide and a nickel oxyhydroxide-containing material; and the barrier layer adjacent the first layer is substantially non-reactive with the first layer in the presence of the electrolyte.

In a second aspect of the invention, a primary electrochemical cell is disclosed, the cell comprising an aqueous alkaline electrolyte, a negative electrode in electrical contact with a negative casing, a positive electrode in electrical contact with a positive casing, an insulating gasket disposed between the negative casing and the positive casing, and a separator disposed between the negative electrode and the positive electrode. The positive electrode comprises a first layer that is in electrical contact with the positive casing, comprises a silver nickel oxide, and is free of silver-containing oxide compounds containing silver as the only metal. The positive electrode also comprises a single barrier layer that is disposed on the first layer between the first layer and the separator, comprises at least one of nickel oxyhydroxide and a nickel oxyhydroxide-containing material, and is free of silver-containing oxides.

In a third aspect of the invention, a primary electrochemical cell is disclosed, the cell comprising an aqueous alkaline electrolyte, a negative electrode in electrical contact with a negative casing, a positive electrode in electrical contact with a positive casing, an insulating gasket disposed between the negative casing and the positive casing, and a separator disposed between the negative electrode and the positive electrode. The positive electrode comprises a first layer that is in electrical contact with the positive casing and comprises a silver-containing oxide. The positive electrode also comprises two or more barrier layers disposed between the first layer and the separator, one barrier layer adjacent the separator that comprises at least one of nickel oxyhydroxide and a nickel oxyhydroxide-containing material and is free of silver-containing oxides, and at least one intermediate barrier layer between the first layer and the barrier layer adjacent the separator that is substantially non-reactive with all adjacent positive electrode layers in the presence of the electrolyte.

In another aspect of the invention, a process for preparing an electrochemical cell is disclosed, comprising the steps of providing a first layer for a positive electrode comprising one or more silver-containing oxides, providing a surface of the first layer with one or more barrier layers; combining the positive electrode, a negative electrode and an aqueous alkaline electrolyte, with a separator between the positive and negative electrodes and the one or more barrier layers disposed between the first layer of the positive electrode and the separator; wherein at least one of the one or more barrier layers comprise one or more of nickel oxyhydroxide and a nickel oxyhydroxide-containing material, and wherein the barrier layer adjacent the first layer is substantially non-reactive with the first layer in the presence of the electrolyte.

As used herein, a barrier layer that is substantially non-reactive with another positive electrode layer is a barrier layer comprising no active material that would react with any of the electrode materials in the adjacent first layer in the presence of the cell electrolyte at a rate high enough to result in a loss of more than about 5 percent of that active material's discharge capacity per year at room temperature.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

The invention relates to positive electrodes and electrochemical cells including the positive electrodes. While the invention is applicable to all types of casing structures, such as, but not limited to, a round cell such as a button-type cell; a flat cell; and a prismatic cell, the following description is described in relation to a button-type cell. Button-type cells are generally cylindrical in shape and have maximum diameters that are greater than their total heights. Flat cells or prismatic cells are typically rectangular in shape, but are not limited thereto, and can be square and have a length substantially equal to a width of the cell or otherwise can be non-circular in shape. Preferred cell types include alkaline cells that contain zinc as a negative electrode active material and at least a silver-containing oxide as a positive electrode active material.

Figure 1:
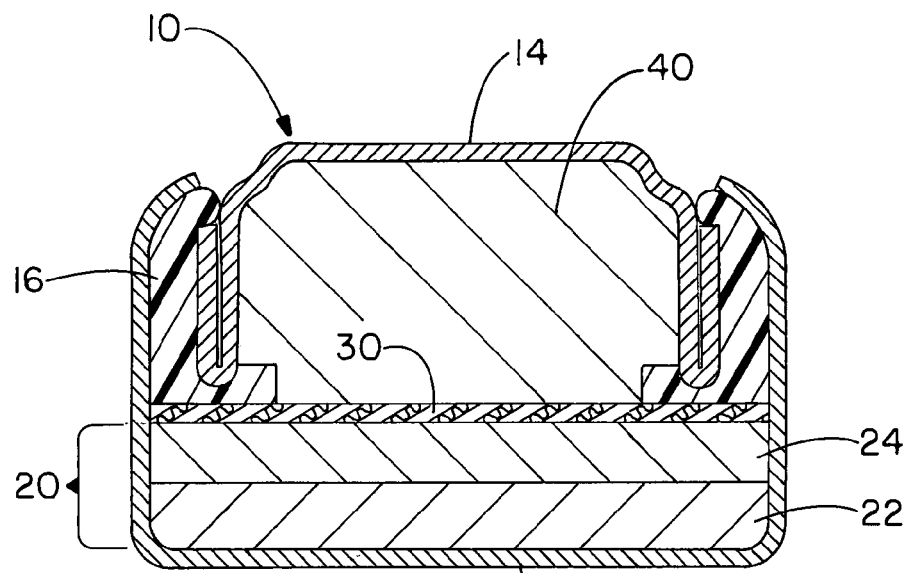
FIG. 1 is a cross-sectional elevational view of one embodiment of an electrochemical cell of the present invention, wherein the positive electrode is shown having two layers.

One embodiment of a button-type cell 10 is illustrated in FIG. 1. Cell 10 includes a positive electrode casing 12, a negative electrode casing 14 and a gasket 16 comprising an insulating material disposed between the casings 12, 14. A positive electrode 20 and negative electrode 40 are contained within cell 10 and separated by a separator 30.

Positive casing 12 is generally metal and can be formed of one or more, same or different, layers of metal, with examples including, but not limited to, nickel, nickel plated cold rolled steel, stainless steel, and nickel plated stainless steel, with nickel plated cold rolled steel preferred.

Figure 2:
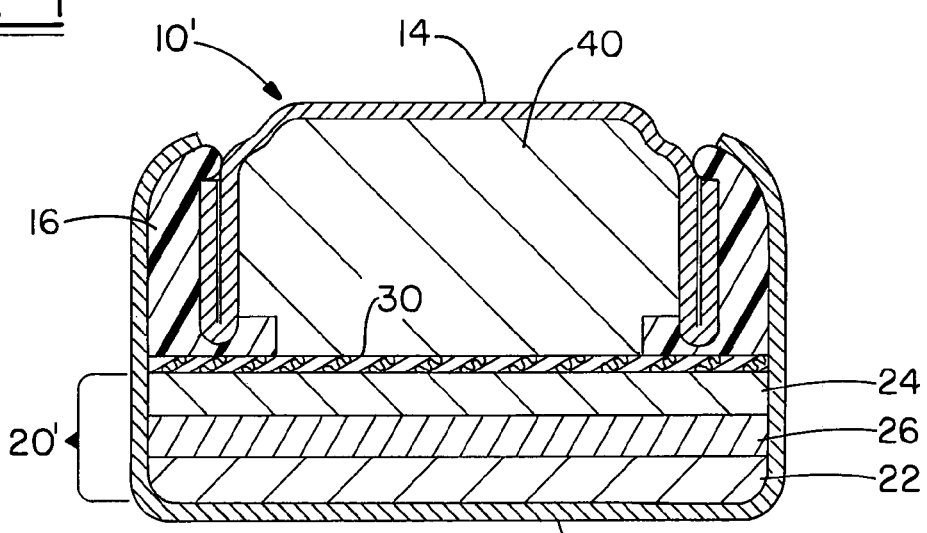
FIG. 2 is a cross-sectional elevational view on a further embodiment of an electrochemical cell of the present invention, wherein the positive electrode is shown having three layers.

Positive electrode 20 is in electrical contact with positive electrode casing 12 and includes two or more layers, with a two layer construction 22, 24 shown in FIG. 1 and a three layer construction 22, 24, 26 shown in FIG. 2 for positive electrode 20' of cell 10'. First layer 22 of positive electrode 20 faces the base of positive casing 12 and is electrically connected, preferably directly, to positive casing 12 with a barrier layer 24 disposed between first layer 22 and separator 30. In a three layer construction, intermediate barrier layer 26 is disposed between first layer 22 and barrier layer 24. In a construction having more than three layers, there is more than one intermediate barrier layer between the first layer 22 and barrier layer 24.

First layer 22 or any other layer separated by a positive electrode barrier layer from the separator 30 can include one or more silver-containing oxides as an active material. The silver-containing oxides generally have the chemical formula: $Ag_xM_yO_2$ wherein M is one or more metals such as, but not limited to, nickel, copper, iron, chromium, and cobalt, with nickel being preferred; x is from greater than zero to 4 and preferably 1 to 3; and y is zero to but not including 4 and preferably 1 to 3. In a preferred embodiment, the silver-containing oxide is one or more of a silver oxide (such as AgO, $Ag_2O$, and/or other silver oxides in which y is zero) and a silver nickel oxide (wherein M comprises nickel and y is greater than zero. The silver-containing oxide is present in the first layer 22 in an amount from about 40 to about 97.9 weight percent, and preferably from about 85 to about 94 weight percent, based on the total weight, i.e., 100 weight percent, of the dry weight of solids insoluble in the electrolyte in the silver-containing oxide layer 22. In one embodiment, a weight ratio of $Ag_2O$ to $AgNiO_2$ is about 96:4, and the silver-containing oxide layer 22 contains no non-active conductive material, since $AgNiO_2$ is more electrically conductive than $Ag_2O$. Monovalent silver oxide ($Ag_2O$) is available from Ames Goldsmith Corp. of Glens Falls, N.Y., USA. Silver nickel oxide ($AgNiO_2$) is available from Dowa Metals and Mining Co. of Tokyo, Japan.

The first layer 22 can optionally include one or more other active materials such as manganese dioxide, nickel oxyhydroxide, nickel oxyhydroxide-containing material and copper oxide (e.g., $Cu_2O$ or, preferably, CuO). The manganese dioxide is present in an amount from about 0 to about 50 weight percent, and preferably from 0 to about 30 weight percent. The manganese dioxide can be an electrolytic manganese dioxide, such as is available from Tosoh Corp. of Tokyo, Japan. One or more of nickel oxyhydroxide and nickel oxyhydroxide-containing material, which are each reactive with silver oxide in the presence of an alkaline electrolyte, can be present in a total amount of up to about 40 weight percent and preferably are not present in the first layer. Nickel oxyhydroxide is available from Tanaka Chemical Corp. of Fukui, Japan. γ- and β-grade nickel oxyhydroxide are suitable for use in the present invention. Spherical material particles such as one or more of nickel oxyhydroxide and silver nickel oxide are used in the positive electrode in one embodiment of the invention to increase packing density. In a preferred embodiment, the barrier or intermediate barrier layer immediately adjacent to the first layer 22 is free or substantially free of an active material which is reactive with the silver-containing material in the presence of the electrolyte utilized within the cell.

As silver-containing oxides are relatively poor conductors, the first layer preferably includes a conductive material, such as one or more of graphite, carbon black and acetylene black generally in an amount from about 2 to about 10 weight percent, and preferably from about 2 to 6 weight percent. A suitable graphite is available from SGL Technic, Inc. of Valencia, Calif., USA. A binder can also be utilized in the first layer 22 and can be present generally in an amount from about 0.1 to 3 weight percent and preferably from 0.5 to 1 weight percent. The binder is added to enhance the structural integrity of the layer, such as by promoting adhesion between individual particles of the layer. Examples of binder materials include POLYMIST®, a polytetrafluoroethylene (PTFE) powder, from Solvay Solexis of Thorofare, N.J., USA.

One or more barrier layers of the positive electrode are disposed between the first layer 22 and the separator 30. In an important aspect of the present invention, at least the barrier layer 24 disposed immediately adjacent the separator 30 is free of a silver-containing material. As indicated above, it has been found in prior art cell constructions that, in the presence of an alkaline electrolyte such as potassium hydroxide, the silver of the silver-containing material is soluble and the silver ions can migrate to the separator and negative electrode side of a cell. The silver ions can attack and degrade or destroy certain separators, thereby shortening cell life. Further, the silver ions can diffuse to the negative electrode where they are chemically reduced by the active materials such as zinc and deposited upon the surface thereof as metallic particles, and the negative electrode can be oxidized, so the cell thereby undergoes self-discharge which can diminish total capacity of the cell. The metal particles formed on the negative electrode active material can deposit and form dendrites that can grow outwardly from the surface of the negative electrode active material towards the cathode, penetrating the separator, and can cause an internal short circuit in the cell. As a result, shelf life of an alkaline cell having migratable silver ions can be extensively degraded, especially during storage at elevated temperatures. The silver ion migration to the separator and negative electrode side of the cell is significantly reduced when the cell is provided with a barrier layer 24 adjacent the separator 30, with the barrier layer 24 free of silver-containing material.

The barrier layer 24 or layers 24 and 26 are part of the positive electrode 20 and are distinct from the cell separator 30. Each barrier layer includes one or more of an active material and a conductive material. At least one of the one or more barrier and intermediate barrier layers 24 and 26 includes one or more of nickel oxyhydroxide and a nickel oxyhydroxide-containing material (i.e., a substituted nickel oxyhydroxide compound in which a portion of the nickel is substituted with another metal). Nickel oxyhydroxide is desirable because it is not soluble in the alkaline electrolyte, maintains a relatively uniform voltage on discharge compared to manganese dioxide, and is inexpensive compared to silver oxide. Nickel oxyhydroxide can also act as a scavenger for silver ions in solution in the electrolyte.

The barrier and intermediate barrier layers 24 and 26, independently, are also open to the inclusion of one or more other components, such as binders, conductive materials, color indicators, etc., preferably which do not substantially affect the ability of the barrier layer 24 adjacent the separator to prevent or slow migration of silver ions through the barrier layer 24. Suitable active materials for each barrier and intermediate barrier layer 24 and 26 independently include, but are not limited to, metal oxides, such as manganese dioxide and copper oxide; nickel oxyhydroxide and a nickel oxyhydroxide-containing material. The conductive materials and binders described hereinabove for the first layer 22 are also suitable for use in barrier and intermediate barrier layers 24 and 26. It is desirable that the active materials in barrier and intermediate barrier layers 24 and 26 are utilized is non-reactive in the presence of an alkaline electrolyte with materials in immediately adjacent layers. As indicated above, nickel oxyhydroxide is reactive with silver oxide in the presence of an alkaline electrolyte. Therefore, it is desired that such active materials are not situated either in the same layer or in layers adjacent to each other in a layered construction of the positive electrode.

An example embodiment for a single barrier layer 24 disposed between the separator 30 and first layer 22, such as shown in FIG. 1, is as follows. In one embodiment, the first layer 22 includes the active material silver nickel oxide. The barrier layer 24 is provided that contains an active material such as nickel oxyhydroxide or a nickel oxyhydroxide-containing material. Preferably a conductive material, and further preferably a binder are present in both the first layer 22 and barrier layer 24. The combination of silver nickel oxide in the first layer 22 and nickel oxyhydroxide in the barrier layer 24 is a preferred combination for an embodiment with a single barrier layer because the nickel oxyhydroxide is substantially non-reactive with the silver nickel oxide.

Silver nickel oxide is present in first layer 22 in an amount from about 40 to about 97.9 weight percent, and preferably from about 80 to 97.9 weight percent, based on the total weight of the dry weight of the solids insoluble in the electrolyte in the first layer 22. The first layer 22 can optionally include manganese dioxide in an amount from 0 to about 50 weight percent, and preferably from 0 to about 30 weight percent. One or more of nickel oxyhydroxide and a nickel oxyhydroxide-containing material can optionally be present in a total amount of less than 10 weight percent, and preferably are not present in first layer 22. Conductive material is present in an amount from about 2 to about 10 weight percent, and preferably from about 2 to about 6 weight percent. A binder is present in an amount from about 0.1 to about 3 weight percent, and preferably from about 0.5 to 1 weight percent. Barrier layer 24 disposed on first layer 22 and adjacent to separator layer 30, in one embodiment includes manganese dioxide in an amount from 0 to about 27.9 weight percent, preferably less than 10 weight percent; one or more of nickel oxyhydroxide and a nickel oxyhydroxide-containing material in a total amount from about 70 to about 97.9 weight percent, and preferably from about 80 to about 96 weight percent; conductive material in an amount from about 2 to about 10 weight percent and preferably about 2 to about 6 weight percent; and a binder in an amount from about 0.1 to about 3 weight percent, and preferably from about 0.5 to about 1 weight percent. In a preferred embodiment of the bi-layer configuration, the weight ratio of first layer 22 to barrier layer 24 is preferably from about 0.2:1 to about 0.9:1.

One embodiment of a three layer positive electrode 20, including two barrier layers 24 and 26, is illustrated in FIG. 2. In a preferred embodiment, the first layer 22 is a silver oxide-containing layer, such as described hereinabove. Intermediate barrier layer 26 disposed on the first layer 22 includes manganese dioxide in an amount generally from about 70 to about 97.9 weight percent and preferably from about 90 to about 96 weight percent; one or more of nickel oxyhydroxide and a nickel oxyhydroxide-containing material in a total amount of less than 5 weight percent and preferably is free of nickel oxyhydroxide and a nickel oxyhydroxide-containing material; conductive material in an amount from about 2 to about 10 weight percent and preferably from about 2 to about 6 weight percent; and a binder in an amount from 0.1 to about 3 weight percent and preferably from 0.5 to 1 weight percent. Barrier layer 24 disposed on intermediate barrier layer 26 and adjacent to separator layer 30 includes manganese dioxide generally in an amount from 0 to about 27.9 weight percent, preferably less than 10 weight percent; one or more of nickel oxyhydroxide and nickel oxyhydroxide-containing material in a total amount from about 70 to about 97.9 weight percent, preferably from 80 to 96 weight percent; conductive material in an amount from about 2 to about 10 weight percent, preferably about 2 to about 6 weight percent; and a binder in an amount from about 0.1 to about 3 weight percent, and preferably from about 0.5 to about 1 weight percent. In this embodiment, both barrier layers 24 and 26 are free of silver-containing material. Advantages of manganese dioxide include its stability in alkaline electrolyte in the presence of silver oxide and its low cost compared to silver oxide. Preferably an intermediate barrier layer 26 contains manganese dioxide and neither nickel oxyhydroxide nor nickel oxyhydroxide-containing material so that intermediate barrier layer 26 separates the silver oxide containing first layer 22 from the nickel oxyhydroxide barrier layer 22 to substantially prevent reaction of the nickel oxyhydroxide with the silver oxide. In an alternative embodiment the intermediate barrier layer 26 contains electrically conductive material that is substantially non-reactive with the active materials in the barrier layer 24 and first layer 22 (e.g., NiOOH and $Ag_2O$, respectively).

First layer 22 and barrier layer 24 are present in an amount generally from about 20 to about 95 weight percent, and preferably in an amount from about 70 to about 85 weight percent based upon the total weight of the positive electrode, with the remaining weight percent being one or more intermediate barrier layers 26. The weight ratio of the first layer 22 to barrier layer 24 is preferably from about 0.2:1 to 10:1.

Figure 3:
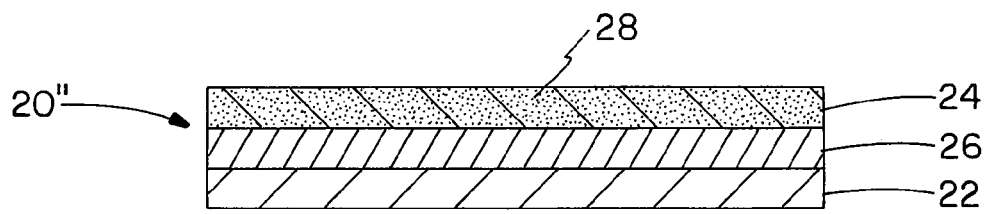
FIG. 3 is a cross-sectional elevational view of one embodiment of a positive electrode pellet including a color indicator in a layer having an exposed surface.

A color indicator can be included in one or more layers of the positive electrode 20 preferably a surface layer, in one embodiment in order to assist in identification, for example, of a side or surface of the positive electrode 20. The color indicator can be any suitable component, such as a pigment, dye, or other coloring agent, preferably non-reactive with the components of the layer to which the indicator is added. In a preferred embodiment as described below, the positive electrode 20" is formed into a multi-layered pellet such as shown in FIG. 3, and presence of the color indicator 28 within a surface layer such as barrier layer 24 as shown, can aid in the placement of the pellet within positive electrode casing 12. The color indicator can be visible under one or more ambient conditions, ultraviolet light, or the like, and visible to the naked eye or a suitable detector. An example of a suitable color indicator is PLASWITE® PS7231, a polystyrene based master batch containing a blend of white and blue pigments, available from Cabot Corporation of Leuven, Belgium.

A positive electrode 20 of the present invention can be fabricated in one embodiment as follows. Components of a surface layer of the electrode, such as first layer 22 or barrier layer 24 to be disposed adjacent the separator 30 is formed by mixing the desired components, preferably to obtain a dispersed mixture. The dispersed mixture is placed into a form of a desired size and compacted at least partially, preferably without inducing cracking (e.g., about 5 percent of the force used in the final compaction of the multi-layer electrode). After the first compaction step, an additional layer containing desired components, preferably substantially dispersed by mixing, is added to the form onto the previously compacted layer and a further compaction step is performed. Afterwards, any additional layers are added to the compressed structure as desired. After all desired layers have been added thereto and compacted as desired, the composite structure is preferably compressed a final time thereby forming a pellet such as shown in FIG. 3, which is removed from the form and adapted to be inserted or placed within an appropriate positive electrode casing 12. To minimize degradation of the silver oxide it is preferable to keep the silver-containing material dry and store it in the dark during mixing and electrode manufacturing, before combining the positive and negative electrodes in cell assembly.

Separator 30 is situated between positive electrode 20 and negative electrode 40 and is an ionically conductive structure of one or more layers. Various types and combinations of separators have been used in silver-containing cells. For example, separator systems have included the combination of a barrier separator, such as a bilaminate material of cellophane and grafted polyethylene such as PERMION from Nitto Denko of Osaka, Japan; and an electrolyte soak-up separator such as celluloid non-woven material that can include polymeric blends, for example S3703 from Kimberly-Clark of Neenah, Wis., USA.

Advantageously, the positive electrode 20 of the present invention, by separating the silver-containing material from the separator with another positive electrode layer, reduces the ability of aggressive silver ions to attack the separator 30 and allows for a relatively inexpensive single layer separator 30 commonly used in other types of aqueous alkaline cells to be utilized in the cells 10 of the present invention. A further advantage gained by using a single layer separator 30 or thin multi-layer separators is that more volume is available within the cell casings 12 and 14 for active materials. Examples of suitable separators include, but are not limited to, cellulosic separator materials (either woven or non-woven) such as rayon, cotton and wood fiber (e.g. paper), and combinations thereof. An example of a preferred separator material includes rayon bound with polyacrylic acid, such as FS22824AB grade separator from Carl Freudenberg KG, Weinheim, Germany, and BVA 02530 grade separator from Hollingsworth & Vose, East Walpole, Mass., USA. Polymer separator materials, optionally surface treated, such as polyethylene and polyvinyl acetate, can also be utilized. Use of such separator materials can provide a suitable separator of reduced total thickness compared to separators typically used in silver oxide cells according to the prior art. For example, instead of two separator layers with a total thickness of about 0.20 mm (0.008 inch), it may be possible to use a single layer separator about 0.10 mm (0.004 inch), and possibly as little as 0.025-0.056 mm (0.001-0.002 inch) thick.

Cells 10 and 10' include a negative electrode casing 14 which forms the top of cells 10 and 10' as shown in FIGS. 1 and 2. Casing 14 is preferably formed of a substrate including a material having a sufficient mechanical strength for the intended use. The negative electrode casing 14 is preferably a metal of one or more layers. In one embodiment, the negative electrode casing 14 is a laminate comprising, for example, from exterior layer to interior layer, nickel/stainless steel/copper, tin/nickel/stainless steel/copper/tin, stainless steel/copper, tin/stainless steel/copper/tin, or variations thereof. In a preferred embodiment, the negative electrode casing is nickel/stainless steel/copper. Suitable casings are available from TMI of Lincoln, R.I., USA and Neomax of Shaumburg, Ill., USA.

As known in the art, negative electrode casing 14 can be a straight-walled anode casing that has a terminal end that defines an opening in the negative electrode casing, or a refold negative electrode casing. A refold negative electrode casing generally has a rounded rim that is substantially U-shaped at the end that defines the opening therein, and is generally formed in one embodiment by folding a portion of the wall of the casing back upon itself so that the opening in the casing is defined by the folded rim. The formed casings can be pre- and/or post-plated with another metal or alloy to minimize hydrogen gassing within the cell and/or improve the corrosion resistance or appearance of the external surface of the casing. Preferred plated metals for reducing hydrogen gassing are metals with high hydrogen overpotentials, such as copper, tin, zinc, and combinations and alloys thereof. The material type and thickness used for the negative electrode casing 14 will be such that the casing 14 has sufficient strength to withstand forces applied during cell assembly and maintain a good seal.

The electrolyte solution can be any of the electrolyte solutions commonly used in alkaline batteries. The electrolyte solution can be an alkaline solution, such as an aqueous alkaline metal hydroxide solution, for example, sodium hydroxide, potassium hydroxide, or mixtures of alkali metal hydroxide solutions, for example, a mixture of potassium hydroxide and sodium hydroxide. In some embodiments, the electrolyte solution can include minor amounts of additives such as zinc oxide and a glycol such as polyethylene glycol-based compounds. In one embodiment, the electrolyte composition is a mixture of about 10 weight percent sodium hydroxide solution and 90 weight percent potassium hydroxide solution based on the total weight of water and the potassium hydroxide and sodium hydroxide solutes.

The negative electrode 40 can be formed of generally any zinc materials utilized in alkaline cell negative electrodes. The anode mixture preferably includes zinc powder which can be a zinc metal or a zinc alloy. Zinc utilized can be amalgamated or non-amalgamated. Amalgamated zinc can contain about 3 weight percent mercury, for example. Examples of non-amalgamated zinc are described in U.S. Pat. Nos. 6,602,629 (Guo et al.), 5,464,709 (Getz et al.), 5,312,476 (Uemura) and US Patent Publication No. 2005/0106461A1, which are hereby incorporated by reference, and include 1230 grade zinc from Zinc Corporation of America (Monaca, Pa., USA) and grades BIA, NGBIA 100, NGBIA 110 and NGBIA 115 from N.V. Umicore, S.A. (Brussels, Belgium).

As indicated above, the negative electrode mixture also includes an electrolyte solution. Further, additives such as one or more gelling agents, binders, and a gassing inhibitors can be included in the negative electrode. Examples of suitable gelling agents or binders include, but are not limited to, polyacrylic acids or salts thereof, grafted starch materials, polyacrylates and carboxymethyl cellulose. Carboxymethyl cellulose is available as 7H3SF from Aqualon Corporation of Wilmington, Del., USA. Gassing inhibitors can be one or more organic or inorganic materials such as phosphate esters; ionic surfactants; nonionic surfactants; bismuth, tin, lead or indium, including alloys with a zinc; or a soluble compound, such as indium acetate, indium hydroxide, indium sulfide, bismuth oxide and barium hydroxide.

Gasket 16 is made from a dielectric material, preferably a polymeric or elastomeric material which serves as a seal between the positive electrode casing 12 and negative electrode casing 14. In one embodiment, the gasket is formed of Nylon-6,6. The bottom edge of the gasket 16 is generally formed having a lip that abuts the rim of the negative electrode casing 14. Optionally, a sealant may be applied to the sealing surface of the gasket, positive electrode casing 12 and/or negative electrode casing 14. Suitable sealant materials would be recognized by one skilled in the art. Examples include asphalt, either alone or with elastomeric materials or ethylene vinyl acetate, aliphatic or fatty polyamides, polyolefins such as polyethylene or polypropylene, polyamine, and polyisobutylene.

During assembly of the cell 10 or 10', the positive electrode casing 12 is filled with the desired amount of electrolyte, a positive electrode pellet 20, 20' or 20" is added to positive electrode casing 12, with the barrier layer 24 free of silver-containing material facing upward and adapted to be disposed adjacent the separator 30. Separator 30 is placed over positive electrode pellet 20, 20' or 20". Gasket 16 is disposed within positive casing 12. Negative electrode 40, which is a relatively thick or gelled material, is placed in the central area of separator 30 so that negative electrode casing 14, with rim thereof facing downward, can be inserted into the positive electrode casing with a rim thereof abutted against the lip of the gasket 16 and compressed thereagainst, with gasket 16 located between the positive electrode casing 12 and negative electrode casing 14, thereby forming a seal and an electrical barrier between the casings 12 and 14.

Any suitable method may be used to deform the edge of the casing inward to seal the cell, including crimping, colleting, swaging, redrawing, and combinations thereof as appropriate. Preferably the button cell is sealed by crimping or colleting with a segmented die so that the cell can be easily removed from the die while a better seal is produced. As used herein, a segmented die is a die whose forming surfaces comprise segments that may be spread apart to enlarge the opening into/from which the cell being closed is inserted and removed. Preferably portions of the segments are joined or held together so they are not free floating, in order to prevent individual segments from moving independently and either damaging the cell or interfering with its insertion or removal. Preferred crimping mechanisms and processes are disclosed in commonly owned U.S. Pat. No. 6,256,853, which is hereby incorporated by reference.

EXAMPLE

The following examples illustrate the reduction in silver ion migration to the separator and anode compartment by using a positive electrode configuration having a barrier layer free of a silver-containing material disposed adjacent to the separator and between a silver-containing positive electrode layer and separator. SR44-size button cells were formed utilizing a control formulation including a positive electrode formed of a single layer, namely, a mixture of silver oxide and nickel oxyhydroxide, and an example positive electrode formulation having three layers, namely a silver-containing oxide first layer, an electrolytic manganese dioxide intermediate barrier layer, and an upper nickel hydroxide surface barrier layer that was disposed adjacent a cell separator. The positive electrodes were formed into pellets prior to insertion into cells as described above.

The control pellet had a weight of 0.91 grams consisting of 50 weight percent silver oxide ($Ag_2O$), 38 weight percent NiOOH, 10 weight percent electrolytic manganese dioxide, 1 weight percent graphite and 1 weight percent POLYMIST® F5A.

The example three layer positive electrode pellet had a weight of 0.84 grams with the silver oxide-containing layer having a weight of 0.42 grams, the electrolytic manganese dioxide layer having a weight of 0.17 grams and the nickel oxyhydroxide layer having a weight of 0.25 grams. The silver oxide-containing layer was 94 weight percent silver oxide, 5 weight percent graphite and 1 weight percent POLYMIST® F5A. The electrolytic manganese dioxide layer was 96 weight percent manganese dioxide, 3 weight percent graphite and 1 weight percent POLYMIST® F5A. The nickel oxyhydroxide layer was 96 weight percent nickel oxyhydroxide, 3 weight percent graphite and 1 weight percent POLYMIST® F5A.

The electrolyte solution in the negative electrode compartment of control cells and example cells was analyzed for silver ions after storage for nine days at each of two temperatures—room temperature and 45° C. The control cells having a monolayer positive electrode included 34.0 micrograms of silver per gram of electrolyte solution, whereas the tri-layered positive electrode contacting cells only included 0.1 microgram of silver per gram of electrolyte solution after nine days at room temperature. The control cells having a monolayer positive electrode included 17.5 micrograms of silver per gram of electrolyte solution, whereas the tri-layered positive electrode only included 0.1 microgram of silver per gram of electrolyte solution after nine days at 45° C.

Accordingly, the cells containing a barrier layer free of a silver-containing material and including nickel oxyhydroxide are an effective absorber of silver ions, and inhibit silver ion migration into the negative electrode compartment. The EMD layer present in the positive electrode separates the silver oxide from direct contact with the nickel oxyhydroxide. Therefore, the silver oxide will not react quickly with the nickel oxyhydroxide in the electrolyte solution. After any dissolved silver ions pass through the EMD layer and reach the nickel oxyhydroxide layer, they will exchange with protons in the nickel oxyhydroxide.

It will be understood by those who practice the invention and those skilled in the art, that various modifications and improvements may be made to the invention without departing from the spirit of the disclosed concepts. The scope of protection afforded is to be determined by the claims and by the breadth of interpretation allowed by law.

What is claimed is:

1. A primary electrochemical cell comprising an aqueous alkaline electrolyte, a negative electrode in electrical contact with a negative casing, a positive electrode in electrical contact with a positive casing, an insulating gasket disposed between the negative casing and the positive casing, and a separator disposed between the negative electrode and the positive electrode; wherein:

the positive electrode includes a first layer that is in electrical contact with the positive casing and comprises one or more silver-containing oxides, including a silver oxide;

the positive electrode comprises two or more barrier layers disposed on the first layer between the first layer and the separator;

the barrier layer adjacent the first layer comprises manganese dioxide or graphite or a combination thereof; and the barrier layer nearest the separator comprises one or more of nickel oxyhydroxide and a nickel oxyhydroxide-containing material.

2. The electrochemical cell according to claim 1, wherein the silver-containing oxide has the formula $Ag_xM_yO_2$, wherein M is a metal, x is from greater than 0 to 4, and y is from 0 to less than 4.

3. The electrochemical cell according to claim 2, wherein the metal M comprises nickel, copper, or cobalt.

4. The electrochemical cell according to claim 2, wherein the silver-containing oxide is one or more of a silver oxide and a silver nickel oxide.

5. The electrochemical cell according to claim 1, wherein the barrier layer adjacent the separator is initially free of silver-containing material.

6. The electrochemical cell according to claim 1, wherein the first layer comprises from 40 to 97.9 wt. % silver oxide, 0 to 50 wt. % manganese dioxide, less than 40 wt. % nickel oxyhydroxide, 2 to 10 wt. % conductive material, and 0.1 to 3 wt. % binder, wherein the barrier layer adjacent the first layer comprises 70 to 97.9 wt. % manganese dioxide, less than 5 wt. % nickel oxyhydroxide, 2 to 10 wt. % conductive material, and 0.1 to 3 wt. % binder, and wherein the barrier layer adjacent the separator comprises 0 to 27.9 wt. % manganese dioxide, 70 to 97.9 wt. % nickel oxyhydroxide, 2 to 10 wt. % conductive material, and 0.1 to 3 wt.% binder.

7. The electrochemical cell according to claim 6, wherein the first layer comprises from 85 to 94 wt. % silver oxide, less than 30 wt. % manganese dioxide, 2 to 6 wt. % conductive material, and 0.5 to 1 wt. % binder, wherein the barrier layer adjacent the first layer comprises 90 to 96 wt. % manganese dioxide, 2 to 6 wt. % conductive material, and 0.5 to 1 wt. % binder, and wherein the barrier layer adjacent the separator comprises less than 10 wt. % manganese dioxide, 80 to 96 wt. % nickel oxyhydroxide, 2 to 6 wt. % conductive material, and 0.5 to 1 wt. % binder.

8. The electrochemical cell according to claim 1, wherein the negative electrode comprises zinc, and wherein the aqueous alkaline electrolyte comprises at least one of potassium hydroxide and sodium hydroxide.

9. The electrochemical cell according to claim 1, wherein the separator is one or more of a cellulose-based material, a polyethylene, and a polyvinyl acetate.

10. The electrochemical cell according to claim 1, wherein the positive electrode is a pellet.

11. The electrochemical cell according to claim 10, wherein the pellet includes a color indicator in a surface layer to aid in placement of the pellet within the positive electrode casing.

12. A primary electrochemical cell comprising an aqueous alkaline electrolyte, a negative electrode in electrical contact with a negative casing, a positive electrode in electrical contact with a positive casing, an insulating gasket disposed between the negative casing and the positive casing; and a separator disposed between the negative electrode and the positive electrode; wherein the positive electrode comprises:

a first layer that is in electrical contact with the positive casing and comprises a silver-containing oxide;

two or more barrier layers disposed between the first layer and the separator, a barrier layer adjacent the separator that comprises at least one of nickel oxyhydroxide and a nickel oxyhydroxide-containing material and is free of silver-containing oxides, and at least one intermediate barrier layer between the first layer and the barrier layer adjacent the separator that comprises one or a combination of manganese dioxide and graphite and is substantially non-reactive with all adjacent positive electrode layers in the presence of the electrolyte.

13. The electrochemical cell according to claim 12, wherein the intermediate barrier layer adjacent the first layer is free of nickel oxyhydroxide and nickel oxyhydroxide-containing material.

* * * * *